(12) United States Patent
Yasuda et al.

(10) Patent No.: US 11,646,414 B2
(45) Date of Patent: May 9, 2023

(54) POSITIVE ELECTRODE ACTIVE MATERIAL FOR ALKALINE STORAGE BATTERY, AND METHOD FOR PRODUCING POSITIVE ELECTRODE ACTIVE MATERIAL FOR ALKALINE STORAGE BATTERY

(71) Applicant: TANAKA CHEMICAL CORPORATION, Fukui (JP)

(72) Inventors: Taiki Yasuda, Fukui (JP); Mikio Hata, Fukui (JP)

(73) Assignee: TANAKA CORPORATION, Fukui (JP)

( * ) Notice: Subject to any disclaimer, the term of this patent is extended or adjusted under 35 U.S.C. 154(b) by 324 days.

(21) Appl. No.: 16/638,488

(22) PCT Filed: Sep. 5, 2018

(86) PCT No.: PCT/JP2018/032813
§ 371 (c)(1),
(2) Date: Feb. 12, 2020

(87) PCT Pub. No.: WO2019/049874
PCT Pub. Date: Mar. 14, 2019

(65) Prior Publication Data
US 2020/0266437 A1    Aug. 20, 2020

(30) Foreign Application Priority Data

Sep. 11, 2017  (JP) .............................. JP2017-173896

(51) Int. Cl.
*H01M 4/525*    (2010.01)
*H01M 4/32*    (2006.01)
*H01M 4/02*    (2006.01)

(52) U.S. Cl.
CPC ............. *H01M 4/525* (2013.01); *H01M 4/32* (2013.01); *H01M 2004/021* (2013.01); *H01M 2004/028* (2013.01)

(58) Field of Classification Search
CPC .. H01M 4/525; H01M 4/32; H01M 2004/021; H01M 2004/028
See application file for complete search history.

(56) References Cited

U.S. PATENT DOCUMENTS

| 6,447,699 B1 | 9/2002 | Bernard et al. |
| 7,267,874 B2 | 9/2007 | Fittock et al. |

(Continued)

FOREIGN PATENT DOCUMENTS

| CN | 1552109 A | 12/2004 |
| CN | 101388461 A | * 3/2009 |

(Continued)

OTHER PUBLICATIONS

English machine translation of Abe JPH 10326617 A (Year: 1998).*

(Continued)

*Primary Examiner* — Brian R Ohara
*Assistant Examiner* — Aaron J Salter
(74) *Attorney, Agent, or Firm* — Ohlandt, Greeley, Ruggiero and Perle, LLP

(57) ABSTRACT

A positive electrode active material for an alkaline storage battery having excellent over-discharge tolerance and high-temperature tolerance, and a method for producing the positive electrode active material. A positive electrode active material for an alkaline storage battery, containing a hydroxide particle containing at least nickel and solid-solubilized cobalt, and a covering layer containing cobalt, the covering layer covering the hydroxide particle, in which cobalt contained in the covering layer and cobalt contained in the hydroxide particle each have a diffraction peak between (Continued)

diffraction angles of 65° and 66°, the diffraction angles each represented by 2θ in a diffraction pattern obtained by X-ray diffraction measurement.

6 Claims, 2 Drawing Sheets

(56) References Cited

U.S. PATENT DOCUMENTS

| | | | | |
|---|---|---|---|---|
| 2017/0187031 A1* | 6/2017 | Kurita | ............... | H01M 10/0525 |
| 2020/0251730 A1* | 8/2020 | Yasuda | ................. | H01M 10/30 |

FOREIGN PATENT DOCUMENTS

| | | | | | |
|---|---|---|---|---|---|
| CN | | 106463721 A | | 2/2017 | |
| JP | | 7-320735 H | | 12/1995 | |
| JP | | H-10326617 A | * | 12/1998 | |
| JP | | 2002-75372 A | | 3/2002 | |
| JP | | 2004-523067 A | | 7/2004 | |
| JP | | 2007-335154 A | | 12/2007 | |
| JP | | 2007335154 A | * | 12/2007 | |
| JP | | 2011-71125 A | | 4/2011 | |
| JP | | 2011-201764 A | | 10/2011 | |
| JP | | 2014-169201 A | | 9/2014 | |
| JP | | 2016-190784 A | | 11/2016 | |
| WO | WO-2015182665 A1 | * | 12/2015 | ............. | C01G 53/50 |

OTHER PUBLICATIONS

English machine translation of Shimakawa et al. (JP 2007335154 A) (Year: 2007).*

English machine translation of Yu et al. (CN 101388461 A) (Year: 2009).*

International Preliminary Report on Patentability dated Mar. 26, 2020 from corresponding International Patent Application No. PCTIJP2018/032813, 8 pages.

International Search Report dated Oct. 23, 2018 from corresponding International Patent Application No. PCT/JP2018/032813, 5 pages.

Written Opinion dated Oct. 23, 2018 from corresponding International Patent Application No. PCT/JP2018/032813, 4 pages.

Japanese Office Action dated Aug. 3, 2022 for Japanese Appl. No. 2019-540971.

Chinese Office Action dated Aug. 12, 2022 for Chinese Appl. No. 201880059017.0.

* cited by examiner

POSITIVE ELECTRODE ACTIVE MATERIAL FOR ALKALINE STORAGE BATTERY, AND METHOD FOR PRODUCING POSITIVE ELECTRODE ACTIVE MATERIAL FOR ALKALINE STORAGE BATTERY

TECHNICAL FIELD

The present invention relates to a positive electrode active material to be used in a positive electrode of an alkaline storage battery, and particularly relates to a positive electrode active material for an alkaline storage battery having excellent over-discharge tolerance and high-temperature tolerance, and a method for producing the positive electrode active material.

BACKGROUND ART

In recent years, alkaline storage batteries have been used in a wide range of fields such as vehicles because of features such as excellent large current discharge and low-temperature characteristics, and long life. As a positive electrode active material for an alkaline storage battery, for example, a nickel hydroxide particle is used.

On the other hand, improvements in the utilization factor have been demanded of the alkaline storage batteries as well as other storage batteries, and moreover, over-discharge tolerance and a property by which an excellent discharge capacity is obtained even after a storage battery is stored under a high-temperature condition over a long period (hereinafter, sometimes referred to as "high-temperature tolerance.") have also been demanded.

Thus, a positive electrode active material in an alkaline storage battery, wherein a surface of a nickel hydroxide particle is covered with a cobalt hydroxide layer, and cobalt in the cobalt hydroxide layer mainly contains divalent cobalt, is proposed (Patent Literature 1) in order to improve the utilization factor of the alkaline storage battery. Moreover, a positive electrode active material in an alkaline storage battery, containing a cobalt compound such that a surface of a nickel hydroxide particle is covered with a cobalt oxyhydroxide layer, and the valence number of cobalt in the cobalt oxyhydroxide layer is 2.1 to 3.0, is proposed (Patent Literature 2) in order to suppress self-discharge of an alkaline storage battery.

However, even though an alkaline storage battery having satisfactory utilization factor and self-discharge characteristics is obtained with the positive electrode active material of Patent Literature 1 or Patent Literature 2, there has been room for further improvements in the over-discharge tolerance and the high-temperature tolerance.

DOCUMENT LIST

Patent Literatures

Patent Literature 1: Japanese Patent Application Publication No. 7-320735
Patent Literature 2: Japanese Patent Application Publication No. 2014-169201

SUMMARY OF INVENTION

Technical Problem

In view of the circumstances, it is an object of the present invention to provide a positive electrode active material for an alkaline storage battery having excellent over-discharge tolerance and high-temperature tolerance, and a method for producing the positive electrode active material.

Solution to Problem

An aspect of the present invention is a positive electrode active material for an alkaline storage battery, having: a hydroxide particle (hereinafter, sometimes referred to as "hydroxide particle containing nickel.") containing at least nickel and solid-solubilized cobalt; and a covering layer containing cobalt, the covering layer covering the hydroxide particle, wherein cobalt contained in the covering layer and cobalt contained in the hydroxide particle each have a diffraction peak between diffraction angles of 65° and 66°, the diffraction angles each represented by 2θ in a diffraction pattern obtained by X-ray diffraction measurement.

An aspect of the present invention is the positive electrode active material for an alkaline storage battery, wherein the diffraction peak is derived from a trivalent cobalt compound represented by $CoHO_2$.

An aspect of the present invention is the positive electrode active material for an alkaline storage battery, wherein a content by percentage of trivalent cobalt in cobalt contained in the hydroxide particle is 30% by mass or more.

An aspect of the present invention is the positive electrode active material for an alkaline storage battery, wherein a ratio of a content by percentage of the trivalent cobalt contained in hydroxide particles having a secondary particle diameter (≤D10) where a cumulative volume percentage is 10.0% by volume or less to a content by percentage of the trivalent cobalt contained in hydroxide particles having a secondary particle diameter (≥D90) where a cumulative volume percentage is 90.0% by volume or more is 1.20 or more.

An aspect of the present invention is the positive electrode active material for an alkaline storage battery, wherein [secondary particle diameter (D90) of the positive electrode active material for an alkaline storage battery, where cumulative volume percentage is 90.0% by volume−secondary particle diameter (D10) of the positive electrode active material for an alkaline storage battery, where cumulative volume percentage is 10.0% by volume]/secondary particle diameter (D50) of the positive electrode active material for an alkaline storage battery, where the cumulative volume percentage is 50.0% by volume, is 0.80 or more and 1.10 or less.

An aspect of the present invention is a positive electrode having the above-described positive electrode active material for an alkaline storage battery.

An aspect of the present invention is an alkaline storage battery provided with the above-described positive electrode.

An aspect of the present invention is a method for producing a positive electrode active material for art alkaline storage battery, the method including: a covering step of supplying a cobalt salt solution and an alkali solution into suspended matter containing a hydroxide particle containing at least nickel and solid-solubilized cobalt to form a covering containing cobalt on a surface of the hydroxide particle, thereby obtaining a hydroxide particle having the covering formed thereon; and an oxidation step of supplying a gas containing oxygen with a microbubble generator into the suspended matter containing the hydroxide particle having the covering formed thereon while bringing an oxidation catalyst into contact with the suspended matter containing the hydroxide particle having the covering formed thereon, thereby oxidizing at least part of cobalt contained in the covering layer and solid-solubilized cobalt contained in the hydroxide particle.

An aspect of the present invention is the method for producing a positive electrode active material for an alkaline storage battery, wherein the average diameter of the gas containing oxygen is 1.0 µm or more and 50 µm or less.

An aspect of the present invention is the method for producing a positive electrode active material for an alkaline storage battery, wherein a ratio of an amount (volume) of the gas containing oxygen to be supplied into the suspended matter containing the hydroxide particle having the covering formed thereon to a volume of the suspended matter containing the hydroxide particle having the covering formed thereon is 1.00 or more and 2.55 or less.

An aspect of the present invention is the method for producing a positive electrode active material for an alkaline storage battery, wherein the oxidation catalyst contains at least one metal selected from the group consisting of iron, nickel, and chromium, and/or an ion of the metal.

Effects of Invention

According to an aspect of the present invention, a positive electrode active material for an alkaline storage battery having excellent over-discharge tolerance and high-temperature tolerance can be obtained due to cobalt in a hydroxide particle containing nickel and solid-solubilized cobalt, and cobalt in a covering layer containing cobalt, the covering layer covering the hydroxide particle, having a diffraction peak between diffraction angles of 65° and 66°, the diffraction angles represented by 2θ in a diffraction pattern obtained in X-ray diffraction measurement.

According to an aspect of the present invention, the over-discharge tolerance and the high-temperature tolerance of an alkaline storage battery are further improved due to a content by percentage of trivalent cobalt in cobalt contained in the hydroxide particle containing nickel being 30% by mass or more.

According to an aspect of the present invention, further excellent over-discharge tolerance and high-temperature tolerance can be obtained due to a ratio of a content by percentage of trivalent cobalt contained in hydroxide particles having a secondary particle diameter where a cumulative volume percentage is 10.0% by volume or less to a content by percentage of trivalent cobalt contained in hydroxide particles having a secondary particle diameter where a cumulative volume percentage is 90.0% by volume or more being 1.20 or more.

According to an aspect of the present invention, a satisfactory volume capacity density can be obtained, and an increase in reaction resistance can be prevented due to [secondary particle diameter of the positive electrode active material for an alkaline storage battery, where cumulative volume percentage is 90.0% by volume–secondary particle diameter of the positive electrode active material for an alkaline storage battery, where cumulative volume percentage is 10.0% by volume]/secondary particle diameter of the positive electrode active material for an alkaline storage battery, where the cumulative volume percentage is 50.0% by volume, being 0.80 or more and 1.10 or less.

DESCRIPTION OF EMBODIMENTS

Figure 1:
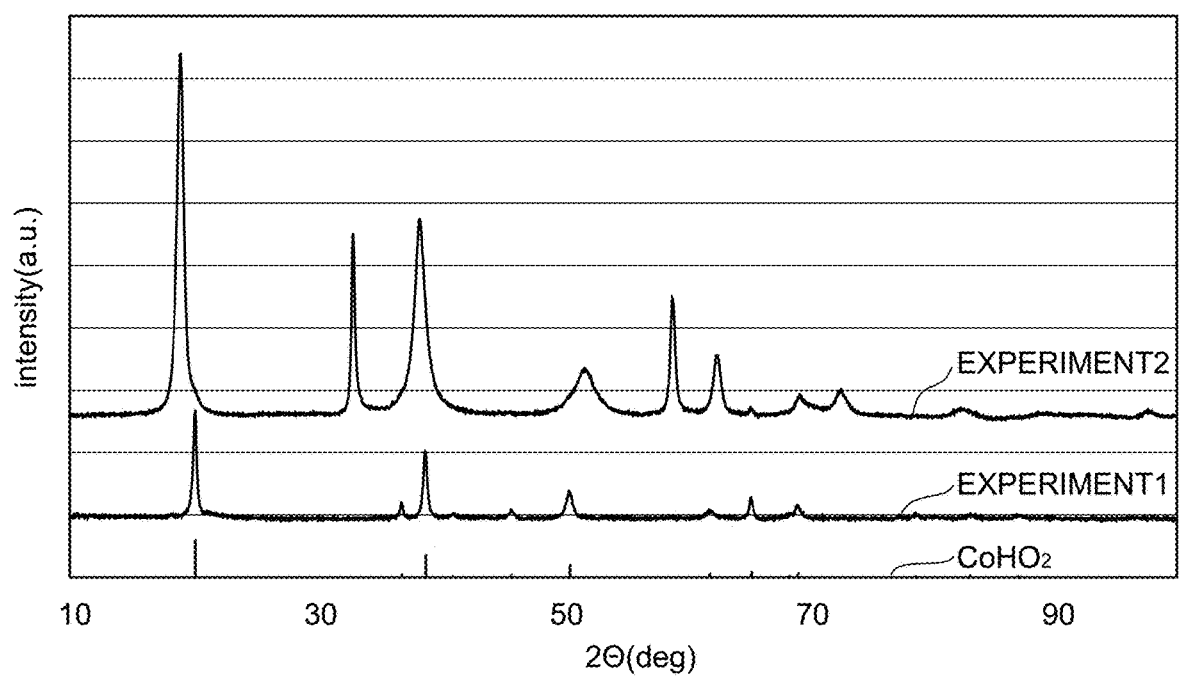
FIG. 1 A graph showing diffraction patterns in X-ray diffraction measurement of Experiment 1, Experiment 2, and cobalt oxyhydroxide.

Hereinafter, a positive electrode active material for an alkaline storage battery of the present invention will be described in detail.

The positive electrode active material for an alkaline storage battery of the present invention has: a hydroxide particle containing at least nickel and solid-solubilized cobalt; and a covering layer containing cobalt, the covering layer covering the hydroxide particle, wherein cobalt contained in the covering layer and cobalt solid-solubilized in the hydroxide particle each have a diffraction peak between diffraction angles of 65° and 66°, the diffraction angles each represented by 2θ in a diffraction pattern obtained by X-ray diffraction measurement. The positive electrode active material for an alkaline storage battery of the present invention has as a core particle a particle of hydroxide containing nickel (Ni), and the core particle is covered with the covering layer containing cobalt. Accordingly, the positive electrode active material for an alkaline storage battery of the present invention is a particle having a coreshell structure and is a nickel-containing hydroxide particle covered with a cobalt-containing compound, the particle having a core which is the hydroxide particle containing nickel and a shell which is the cobalt containing compound.

The shape of the positive electrode active material for an alkaline storage battery is not particularly limited, and examples thereof include an approximately spherical shape.

A nickel-containing hydroxide particle covered with a cobalt-containing compound, which is a positive electrode active material for an alkaline storage battery of the present invention, takes an aspect of, for example, a secondary particle formed by aggregation of a plurality of primary particles. The particle size distribution of the nickel-containing hydroxide particle covered with a cobalt-containing compound is not particularly limited, but, for example, the lower limit value of the secondary particle diameter D50 (hereinafter, sometimes referred to as "D50.") where the cumulative volume percentage is 50% by volume is preferably 4.0 µm, more preferably 6.0 µm, and from the viewpoint of obtaining further excellent over-discharge tolerance and high-temperature tolerance, still more preferably 9.0 µm, and particularly preferably 10 µm. On the other hand, the upper limit value of D50 of the nickel-containing hydroxide particle covered with a cobalt-containing compound is preferably 15.0 µm, and particularly preferably 12.5 µm from the viewpoint of balance between improving the density and securing the contact surface with an electrolytic solution. It is to be noted that the above-described lower limit values and upper limit values can arbitrarily be combined.

The BET specific surface area of the nickel-containing hydroxide particle covered with a cobalt-containing compound is not particularly limited, but, from the viewpoint of, for example, balance between improving the density and securing the contact surface with an electrolytic solution, the lower limit value thereof is preferably 5.0 m²/g, and particularly preferably 10.0 m²/g, and the upper limit value thereof is preferably 30.0 m²/g, and particularly preferably 25.0 m²/g. It is to be noted that the above-described upper limit values and lower limit values can arbitrarily be combined.

The tap density of the nickel-containing hydroxide particle covered with a cobalt-containing compound is not particularly limited, but is preferably 1.5 g/cm³ or more, and particularly preferably 1.7 g/cm³ or more from the viewpoint of, for example, improvements in the filling degree in using the particle as a positive electrode active material.

The bulk density of the nickel-containing hydroxide particle covered with a cobalt-containing compound is not particularly limited, but is preferably 0.8 g/cm³ or more, and particularly preferably 1.0 g/cm³ or more from the viewpoint of, for example, improvements in the filling degree in using the particle as a positive electrode active material.

The positive electrode active material for an alkaline storage battery of the present invention is, as described above, a nickel-containing hydroxide particle covered with a cobalt-containing compound, in which a covering layer containing cobalt is formed on the surface of a hydroxide particle containing nickel and cobalt. The covering layer containing cobalt contains a compound containing cobalt. Moreover, the covering layer containing cobalt may cover the whole surface of the hydroxide particle containing nickel, or may cover a region of a part of the surface of the hydroxide particle containing nickel.

The mass proportion of cobalt in the covering layer containing cobalt in the nickel-containing hydroxide particle covered with a cobalt-containing compound is not particularly limited, but the lower limit value thereof is preferably 1.0% by mass, and particularly preferably 2.0% by mass from the viewpoint of improving the over-discharge tolerance and the high-temperature tolerance more. On the other hand, the upper limit value of the mass proportion of cobalt in the covering layer containing cobalt in the nickel-containing hydroxide particle covered with a cobalt-containing compound is preferably 5.0% by mass, and particularly preferably 4.0% by mass. It is to be noted that the above-described lower limit values and upper limit values can arbitrarily be combined.

Moreover, cobalt in the covering layer containing cobalt is trivalent cobalt.

Examples of the chemical structure of trivalent cobalt include cobalt oxyhydroxide (CoHO₂) (in the present specification, sometimes simply written as "cobalt oxyhydroxide" or "CoHO₂.").

Cobalt contained in the covering layer containing trivalent cobalt and in the hydroxide particle containing nickel each have a diffraction peak between diffraction angles of 65° and 66°, the diffraction angles each represented by 2θ in a diffraction pattern obtained by X-ray diffraction measurement. The diffraction peak is mainly derived from cobalt oxyhydroxide (CoHO₂).

The hydroxide particle containing nickel (Ni) is not particularly limited as long as the hydroxide particle contains nickel (Ni) and solid-solubilized cobalt (Co) in the particle, and examples thereof include a particle in which cobalt is solid-solubilized in nickel hydroxide, and a particle in which cobalt is solid-solubilized in a hydroxide containing nickel (Ni) and, additional transition metal element or elements (for example, at least one transition metal element selected from the group consisting of magnesium (Mg), manganese (Mn), zinc (Zn), and aluminum (Al)).

The content of nickel in the hydroxide particle containing nickel, in the nickel-containing hydroxide particle covered with a cobalt-containing compound is not particularly limited, but the lower limit value thereof is preferably 40% by mass, more preferably 45% by mass, and particularly preferably 50% by mass. On the other hand, the upper limit value of the content of nickel in the hydroxide particle containing nickel, in the nickel-containing hydroxide particle covered with a cobalt-containing compound is preferably 60% by mass, and particularly preferably 57% by mass. It is to be noted that the above-described lower limit values and upper limit values can arbitrarily be combined.

The above-described hydroxide particle containing nickel contains solid-solubilized cobalt from the viewpoint of improving the over-discharge tolerance and the high-temperature tolerance in a well balanced manner. The amount of cobalt solid-solubilized in the hydroxide particle containing nickel in the nickel-containing hydroxide particle covered with a cobalt-containing compound is not particularly limited, but the lower limit value thereof is preferably 0.10% by mass, more preferably 0.20% by mass, and particularly preferably 0.50% by mass from the viewpoint of improving the over-discharge tolerance and the high-temperature tolerance more. On the other hand, the upper limit value of the amount of cobalt solid-solubilized in the hydroxide particle containing nickel in the nickel-containing hydroxide particle covered with a cobalt-containing compound is preferably 5.0% by mass, more preferably 3.0% by mass, and particularly preferably 2.0% by mass. It is to be noted that the above-described lower limit values and upper limit values can arbitrarily be combined.

Moreover, it is preferable that at least part of cobalt solid-solubilized in the hydroxide particle containing nickel be trivalent cobalt from the viewpoint of the over-discharge tolerance and the high-temperature tolerance. The content by percentage of trivalent cobalt in cobalt solid-solubilized in the hydroxide particle containing nickel is not particularly limited, but the lower limit value thereof is preferably 30% by mass, more preferably 35% by mass, and particularly preferably 40% by mass from the viewpoint of improving the over-discharge tolerance and the high-temperature tolerance more. On the other hand, the upper limit value of the content by percentage of trivalent cobalt in cobalt solid-solubilized in the hydroxide particle containing nickel is preferably 80% by mass, more preferably 70% by mass, and particularly preferably 60% by mass from the viewpoint of the process time required for oxidation. It is to be noted that the above-described lower limit values and upper limit values can arbitrarily be combined.

Examples of the chemical structure of trivalent cobalt solid-solubilized in the hydroxide particle containing nickel include cobalt oxyhydroxide (CoHO₂).

As described above, when cobalt oxyhydroxide is solid-solubilized in the hydroxide particle containing nickel, the hydroxide particle containing nickel as well as the covering layer containing cobalt oxyhydroxide has a diffraction peak between diffraction angles of 65° and 66°, the diffraction angles represented by 2θ in a diffraction pattern obtained by X-ray diffraction measurement.

Examples of cobalt other than trivalent cobalt in cobalt solid-solubilized in the hydroxide particle containing nickel include divalent cobalt. Examples of the chemical structure of divalent cobalt include cobalt hydroxide (Co(OH)₂).

The shape of the hydroxide particle containing nickel is not particularly limited, and examples thereof include an approximately spherical shape.

In the nickel-containing hydroxide particle covered with a cobalt-containing compound, which is the positive electrode active material for an alkaline storage battery of the present invention, the ratio of the content by percentage of trivalent cobalt solid-solubilized in the hydroxide particles containing nickel in secondary particle diameters of ≤D10 (hereinafter, sometimes referred to as "≤D10" or "D10 or less.") where the cumulative volume percentage is 10.0% by volume or less to the content by percentage of trivalent cobalt solid-solubilized in the hydroxide particles containing nickel in secondary particle diameters of ≥D90 (hereinafter, sometimes referred to as "≥D90" or "D90 or more.") where the cumulative volume percentage is 90.0% by volume or less is not particularly limited, but is preferably 1.20 or more, more preferably 1.30 or more, and particularly preferably 1.40 or more from the viewpoint of, for example, obtaining excellent over-discharge tolerance and high-temperature tolerance. It is to be noted that examples of the upper limit value of the ratio of the content by percentage of solid-solubilized trivalent cobalt include 2.50.

The content by percentage of trivalent cobalt in cobalt solid-solubilized in the hydroxide particles containing nickel in the particles of D10 or less is not particularly limited, but is preferably 40% by mass to 100% by mass, more preferably 50% by mass to 100% by mass, and particularly preferably 60% by mass to 100% by mass from the viewpoint of improving the over-discharge tolerance and the high-temperature tolerance more.

The upper limit value of the content by percentage of trivalent cobalt in cobalt solid-solubilized in the hydroxide particles containing nickel in the particles of D90 or more is not particularly limited, but is preferably 50% by mass, and particularly preferably 45% by mass from the viewpoint of improving the over-discharge tolerance and the high-temperature tolerance more and securing the uniformity of reaction. On the other hand, the lower limit value of the content by percentage of trivalent cobalt in the solid-solubilized cobalt is preferably 5% by mass, and particularly preferably 10% by mass from the viewpoint of improving the over-discharge tolerance and the high-temperature tolerance more. It is to be noted that the above-described lower limit values and upper limit values can arbitrarily be combined.

[(secondary particle diameter D90 (hereinafter, sometimes referred to as "D90.") where the cumulative volume percentage is 90% by volume–secondary particle diameter D10 (hereinafter, sometimes referred to as "D10.") where the cumulative volume percentage is 10% by volume)/D50], which is an index of indicating the spread of a particle size distribution of the positive electrode active material for an alkaline storage battery of the present invention, is not particularly limited, but, for example, the lower limit value thereof is preferably 0.80, and particularly preferably 0.85 from the viewpoint of obtaining a satisfactory volume capacity density as an alkaline storage battery. On the other hand, the upper limit value of [(D90−D10)/D50] is preferably 1.10, and particularly preferably 1.05 from the viewpoint of preventing selective deterioration of fine particles attributable to local reaction of the positive electrode active material for an alkaline storage battery and preventing an increase in reaction resistance because of being unable to secure a reaction area between an electrolytic solution and the positive electrode active material for an alkaline storage battery sufficiently. It is to be noted that the above-described lower limit values and upper limit values can arbitrarily combined.

Thereafter, an example of a method for producing the positive electrode active material for an alkaline storage battery of the present invention will be described.

The production method includes, for example, a covering step of supplying a cobalt salt solution and an alkali solution into suspended matter (for example, aqueous suspended matter) containing the hydroxide particle containing at least nickel and solid-solubilized cobalt to form a covering containing cobalt on the surface of the hydroxide particle containing nickel, thereby obtaining a hydroxide particle containing nickel, the hydroxide particle having a covering formed thereon; and an oxidation step of supplying a gas containing oxygen with a microbubble generator into the suspended matter containing the hydroxide particle containing nickel, the hydroxide particle having a covering formed thereon, while bringing an oxidation catalyst into contact with the suspended matter (for example, aqueous suspended matter) containing the hydroxide particle containing nickel, the hydroxide particle having a covering formed thereon, thereby oxidizing cobalt contained in the covering layer and cobalt contained in the hydroxide particle.

Hereinafter, details on the above-described example of the production method will be described. Firstly, a salt solution (for example, sulfate solution) of nickel and cobalt or a salt solution (for example, sulfate solution) of nickel, cobalt, and an additional transition metal element (for example, magnesium, manganese, zinc, and/or aluminum), and a complexing agent are reacted by a co-precipitation method to produce a hydroxide particle containing nickel (for example, a particle in which divalent cobalt is solid-solubilized in nickel hydroxide, and a particle in which divalent cobalt is solid-solubilized in a hydroxide containing nickel, and an additional transition metal element (for example, magnesium, manganese, zinc, and/or aluminum)), thereby obtaining suspended matter in the form of slurry containing the hydroxide particle containing nickel. As described above, as the solvent for the suspended matter, for example, water is used.

The complexing agent is not particularly limited as long as the complexing agent can form a complex with nickel, cobalt, and an ion of the additional transition metal element in an aqueous solution, and examples thereof include ammonium ion-supplying bodies (such as ammonium sulfate, ammonium hydrochloride, ammonium carbonate, and ammonium fluoride), hydrazine, ethylenediaminetetraacetic acid, nitrilotriacetic acid, uracildiacetic acid, and glycine. It is to be noted that if necessary, an alkali metal hydroxide (for example, sodium hydroxide or potassium hydroxide) may be added in order to adjust the pH value of the aqueous solution in performing precipitation.

When a complexing agent is supplied continuously into a reaction tank in addition to the salt solution, nickel, cobalt, and the additional transition metal element are reacted and the hydroxide particle containing nickel is produced. In performing reaction, the substances in the reaction tank are stirred appropriately while the temperature of the reaction tank is controlled within the range of, for example, 10° C. to 80° C., preferably 20 to 70° C., and the pH value in the reaction tank is controlled within the range of, for example, a pH of 9 to a pH of 13, preferably a pH of 11 to 13 at a liquid temperature of 25° C. as a standard. Examples of the reaction tank include a continuous type to allow the formed hydroxide particle containing nickel to overflow for the purpose of separation.

Thereafter, the cobalt salt solution (such as, for example, an aqueous solution of cobalt sulfate), and, if necessary, a solution of a salt (for example, a sulfate solution) of the additional transition metal element (for example, magnesium, manganese, zinc, and/or aluminum), and an alkali solution (such as, for example, a sodium hydroxide aqueous solution) are added under stirring with a stirrer to the suspended matter containing the hydroxide particle containing nickel, thereby forming a covering layer containing as a main component a cobalt compound having a valence number of cobalt of two, such as cobalt hydroxide, on the surface of the hydroxide particle containing nickel, by neutralization crystallization. It is preferable to keep the pH in the step of forming a covering layer within the range of 9 to 13 at a liquid temperature of 25° C. as a standard. By the covering step, a hydroxide particle containing nickel, the hydroxide particle having a covering layer containing cobalt formed thereon, can be obtained. The hydroxide particle containing nickel, the hydroxide particle having a covering layer containing cobalt formed thereon, can be obtained as suspended matter in the form of slurry.

Thereafter, a gas containing oxygen is supplied with a microbubble generator into the suspended matter containing the hydroxide particle containing nickel, the hydroxide particle having a covering layer formed thereon, under stirring with a stirrer and in the presence of an oxidizing catalyst to oxidize divalent cobalt in the hydroxide particle containing nickel, the hydroxide particle having a covering layer formed thereon into trivalent cobalt.

Examples of the oxidation catalyst include a compound containing at least one metal selected from the group consisting of iron, nickel, and chromium, and/or an ion of the metal, and specific examples thereof include stainless steel.

The average diameter of the gas (bubbles) containing oxygen, to be supplied with a microbubble generator is not particularly limited, but is, for example, preferably 1.0 μm or more and 50 μm or less, and particularly preferably 2.0 μm or more and 30 μm or less. By controlling the contact with the oxidation catalyst and the average diameter of the bubbles in the range, divalent cobalt contained in the covering layer can be oxidized into trivalent cobalt, and divalent cobalt solid-solubilized in the hydroxide particle containing nickel can also be oxidized into trivalent cobalt more surely. Examples of the gas containing oxygen include a gas composed of oxygen and a gas containing oxygen and additional element or elements, such as air.

Examples of the microbubble generator include YJ Nozzle™ of ENVIROVISION CO., LTD.

The ratio of the amount of oxygen (volume) in the gas containing oxygen, to be supplied into the suspended matter containing the hydroxide particle containing nickel, the hydroxide particle having a covering layer formed thereon to the volume of the suspended matter containing the hydroxide particle containing nickel, the hydroxide particle having a covering layer formed thereon is not particularly limited, and is adjusted to, for example, 1.00 or more and 2.55 or less. By setting the ratio to the range, divalent cobalt solid-solubilized in the hydroxide particle containing nickel can be oxidized into trivalent cobalt efficiently and surely.

Moreover, if necessary, a step of separating the oxidation-treated suspended matter containing the hydroxide particle containing nickel, the hydroxide particle having a covering layer formed thereon, into a solid phase and a liquid phase and drying the solid phase separated from the liquid phase may further be included after the oxidation step. Moreover, if necessary, the solid phase may be washed with a weak alkali water before drying the solid phase. Moreover, if necessary, a compound (for example, an oxide) of an additional metal element (for example, ytterbium, yttrium, zirconium, tungsten, molybdenum, niobium, titanium, magnesium, manganese, zinc, and/or aluminum) may be added by a known method in order to obtain a desired effect (high temperature characteristics, an improvement in electrical conductivity, or preservation of an electrically conductive network).

Thereafter, a positive electrode using the positive electrode active material for an alkaline storage battery of the present invention and an alkaline storage battery using the positive electrode will be described. The alkaline storage battery is provided with a positive electrode using the above-described positive electrode active material for an alkaline storage battery of the present invention, a negative electrode, an alkaline electrolytic solution, and a separator.

The positive electrode is provided with a positive electrode collector and a positive electrode active material layer formed on the surface of the positive electrode collector. The positive electrode active material layer has a positive electrode active material for an alkaline storage battery, a binder (binding agent), and, if necessary, a conductive assistant. The conductive assistant is not particularly limited as long as the conductive assistant can be used for an alkaline storage battery, and, for example, metal cobalt, cobalt oxide, and the like can be used. The binder is not particularly limited, and examples thereof include polymer resins, such as, for example, polyvinylidene fluoride (PVdF), butadiene rubber (BR), polyvinyl alcohol (PVA), and carboxymethyl cellulose (CMC), polytetrafluoroethylene (PTFE), and combinations thereof. The positive electrode collector is not particularly limited, and examples thereof include a perforated metal, an expanded metal, wire netting, a foam metal such as, for example, foam nickel, a mesh-like metal fiber sintered body, and a metal-plated resin sheet.

As a method for producing the positive electrode, for example, a positive electrode active material slurry is first prepared by mixing a positive electrode active material for an alkaline storage battery, a conductive assistant, a binder, and water. Subsequently, the positive electrode collector is filled with the positive electrode active material slurry by a known filling method, and the positive electrode active material slurry is dried, and then rolled and fixed with a press or the like.

The negative electrode is provided with a negative electrode collector and a negative electrode active material layer containing a negative electrode active material, the layer formed on the surface of the negative electrode collector. The negative electrode active material is not particularly limited as long as the negative electrode active material is usually used, and, for example, a hydrogen storage alloy particle, a cadmium oxide particle, a cadmium hydroxide particle, and the like can be used. As the negative electrode collector, electrically conductive metal materials, such as nickel, aluminum, and stainless steel, which are the same materials as the positive electrode collector, can be used.

Moreover, if necessary, a conductive assistant, a binder, or the like may be further added in the negative electrode active material layer. Examples of the conductive assistant and the binder include the conductive assistants and the binders which are the same as those used in the positive electrode material layer.

As a method for producing the negative electrode, for example, a negative electrode active material slurry is first prepared by mixing a negative electrode active material, water, and if necessary, a conductive assistant and/or a binder. Subsequently, the negative electrode collector is filled with the negative electrode active material slurry by a known filling method, and the negative electrode active material slurry is dried, and then rolled and fixed with a press or the like.

In the alkaline electrolytic solution, examples of the solvent include water, and examples of the solute to be dissolved in the solvent include potassium hydroxide, sodium hydroxide, and lithium hydroxide. The solutes may be used singly, or two or more thereof may be used together.

The separator is not particularly limited, and examples thereof include polyolefin nonwoven fabric, such as, for example, polyethylene nonwoven fabric and polypropylene nonwoven fabric, polyamide nonwoven fabric, and those obtained by performing a hydrophilic treatment thereon.

Thereafter, Examples of the present invention will be described, but the present invention is not limited to these Examples unless deviating from the scope thereof.

Firstly, a suspension of a cobalt hydroxide particle not having a covering layer and a suspension of a nickel hydroxide particle having a covering layer of cobalt hydroxide were each brought into contact with stainless steel, which is an oxidation catalyst, under stirring, and further, an oxidation treatment was performed by supplying air therein, thereby converting cobalt hydroxide to cobalt oxyhydroxide. It is to be noted that in an oxidation treatment performed by adding an alkali to the particle obtained by subjecting the suspension to solid-liquid separation/drying, and heating a resultant mixture, γ-cobalt oxyhydroxide is produced, but by performing the above-described oxidation treatment, cobalt oxyhydroxide represented by a chemical formula $CoHO_2$ can be produced. Physical properties of the oxidation-treated cobalt hydroxide particle not having a covering layer (Experiment 1) and the oxidation-treated nickel hydroxide particle having a covering layer of cobalt hydroxide (Experiment 2) are shown in Table 1 described below.

TABLE 1

|  |  | Experiment 1 | Experiment 2 |
|---|---|---|---|
| Ni | % by mass | 0 | 56.6 |
| Total Co | % by mass | 63.4 | 2.91 |
| Co solid-solubilized in hydroxide particle | % by mass | 63.4 | 0 |
| Co in covering layer | % by mass | — | 2.91 |
| Mg | % by mass | 0 | 0 |
| Total oxidized cobalt (Co (III)) | % by mass | 63.4 | 2.91 |
| Total cobalt oxidation rate (content by percentage (% by mass) of oxidize dcobalt (Co (III)) in total Co) | % | 100.00 | 100.00 |
| Co compound species | — | $CoHO_2$ | $CoHO_2$ |

X-ray diffraction measurement was conducted for the samples of Experiment 1 and Experiment 2, and for cobalt oxyhydroxide to analyze the diffraction peaks.

In the X-ray diffraction measurement, measurement was conducted using an X-ray diffraction apparatus (Ultima IV, made by Rigaku Corporation) under the conditions described below.
X-ray: CuKα/40 kV/40 mA
Slit: Divergence=1/2 Light reception=open, Scattering=8.0 mm
Sampling width: 0.03 Scan speed: 20°/min FIG. 1 and FIG. 2 show the results of the X-ray diffraction measurement for the samples of Experiment 1 and Experiment 2, and for cobalt oxyhydroxide.

Figure 2:
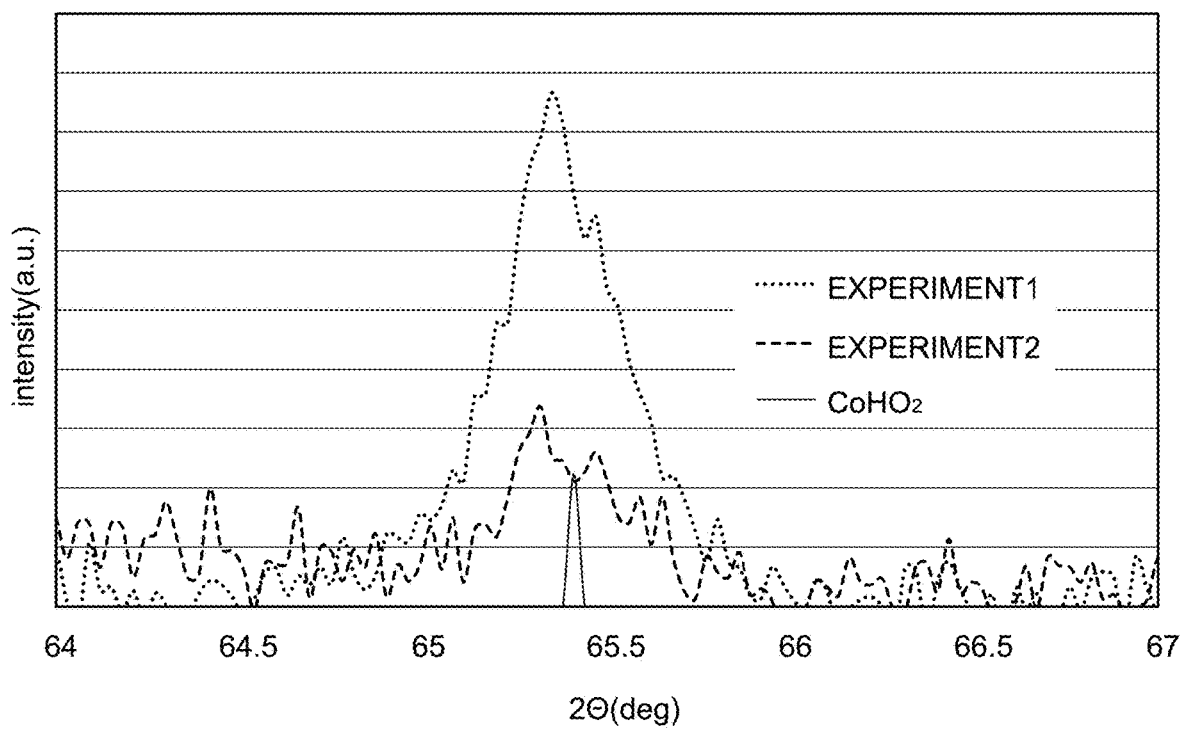
FIG. 2 A partially enlarged graph of the graph showing diffraction patterns in FIG. 1.

As shown in FIG. 1 and FIG. 2, a diffraction peak was observed between diffraction angles of 65° and 66°, the diffraction angles represented by 2θ in the diffraction patterns for any of the samples of Experiment 1 and Experiment 2, and cobalt oxyhydroxide. Accordingly, it was ascertained that the diffraction peak between diffraction angles of 65° and 66°, the diffraction angles represented by 2θ in the diffraction patterns is a peak characteristic of cobalt oxyhydroxide (that is, trivalent cobalt represented by chemical formula $CoHO_2$).

Example 1

Synthesis of Hydroxide Particle Containing Nickel, in which Cobalt is Solid-Solubilized An ammonium sulfate aqueous solution (complexing agent) and a sodium hydroxide aqueous solution were dropped into an aqueous solution obtained by dissolving magnesium sulfate, cobalt sulfate, and nickel sulfate in a predetermined ratio, and the resultant mixture was stirred continuously with a stirrer while the pH in the reaction tank was kept at 12.0 at a liquid temperature of 25° C. as a standard. A produced hydroxide was allowed to overflow from an overflow pipe of the reaction tank and was taken out. Each treatment of washing with water, dehydration, and drying was performed on the hydroxide which was taken out to obtain a hydroxide particle containing nickel, in which cobalt is solid-solubilized.

Formation of Covering Layer Containing Cobalt

The hydroxide particle containing nickel, in which cobalt is solid-solubilized, the hydroxide particle obtained in the manner as described above, was put into an alkali aqueous solution in a reaction bath the pH of which was kept in the range of 9 to 13 at a liquid temperature of 25° C. as a standard with sodium hydroxide. After the hydroxide particle was put into the alkali aqueous solution, a cobalt sulfate aqueous solution the concentration of which was 90 g/L was dropped into the solution under stirring. A sodium hydroxide aqueous solution was dropped appropriately during the dropping to keep the pH of the reaction bath in the range of 9 to 13 at a liquid temperature of 25° C. as a standard to form a covering layer of cobalt hydroxide on the surface of the hydroxide particle, thereby obtaining a suspension of a hydroxide particle containing nickel, in which cobalt is solid-solubilized, the hydroxide particle covered with cobalt hydroxide.

Oxidation Treatment on Hydroxide Particle Containing Nickel, in which Cobalt is Solid-Solubilized, the Hydroxide Particle Covered with Cobalt Hydroxide The suspension of the hydroxide particle containing nickel, in which cobalt is solid-solubilized, the hydroxide particle covered with cobalt hydroxide, the suspension obtained in the manner as described above, was brought into contact with stainless steel as an oxidation catalyst while the suspension was stirred, and further, air having a diameter of 50 μm or less was supplied into the suspension with a microbubble generator ("YJ Nozzle™," ENVIROVISION CO., LTD.) to perform an oxidation treatment. Air was supplied into the suspension in such a way that the ratio of the volume of oxygen contained in the air to the volume of the suspension of the hydroxide particle containing nickel, in which cobalt is solid-solubilized, the hydroxide particle covered with cobalt hydroxide, was 1.28. By the oxidation treatment, cobalt solid-solubilized in the hydroxide particle containing nickel and cobalt hydroxide in the covering layer were each oxidized into cobalt oxyhydroxide, which is trivalent cobalt.

Solid-Liquid Separation and Drying Treatment

Thereafter, each treatment of washing with water, dehydration, and drying was performed on the oxidation-treated suspension to obtain a nickel-containing hydroxide particle of Example 1 covered with a cobalt-containing compound. The physical properties of the nickel-containing hydroxide particle of Example 1 covered with a cobalt-containing compound are shown in Table 2 described below. It is to be noted that in each Example and Comparative Example in Table 2, the amount of "oxidized cobalt (Co (III)) solid-solubilized in the hydroxide particle" was specified assuming that cobalt solid-solubilized in the hydroxide particle containing nickel is oxidized after all of cobalt in the covering layer was oxidized into trivalent cobalt. The physical properties of the nickel-containing hydroxide particle of Example 1 covered with a cobalt-containing compound are shown in Table 2 described below.

Example 2

A nickel-containing hydroxide particle of Example 2 covered with a cobalt-containing compound, the nickel-containing hydroxide particle having a particle size distribution different from the particle size distribution of Example 1, was obtained by keeping the pH in the reaction tank at 12.2 at a liquid temperature of 25° C. as a standard in place of keeping the pH in the reaction tank at 12.0 at a liquid temperature of 25° C. as a standard in Example 1. The physical properties of the nickel-containing hydroxide particle of Example 2 covered with a cobalt-containing compound are shown in Table 2 described below.

Comparative Example 1

A sample of Comparative Example 1 was prepared in the same manner as in Example 1 except that the oxidation treatment was not performed. The physical properties of the sample of Comparative Example 1 are shown in Table 2 described below.

Comparative Example 2

A sample of Comparative Example 2 was prepared in the same manner as in Example 1 except that an oxidation treatment in which the suspension of the hydroxide particle containing nickel, in which cobalt is solid solubilized, the hydroxide particle covered with cobalt hydroxide, was subjected to solid-liquid separation; 10 g of an aqueous solution containing 48% by mass of sodium hydroxide was added to 100 g of a dried particle to be mixed; and a resultant mixture was heat at 100° C. was performed in place of the oxidation treatment in Example 1. The physical properties of the sample of Comparative Example 2 are shown in Table 2 described below.

Comparative Example 3

A hydroxide particle of Comparative Example 3 covered with a cobalt-containing compound was obtained in such a way that in the oxidation treatment, only cobalt hydroxide in the covering layer was oxidized without oxidizing cobalt solid-solubilized in the hydroxide particle containing nickel by performing an oxidation treatment supplying air without using the oxidation catalyst and the microbubble generator in place of bringing the suspension into contact with the stainless steel as an oxidation catalyst and supplying air having a diameter of 50 µm or less with a microbubble generator ("YJ Nozzle™," ENVIROVISION CO., LTD.) in Example 1. The physical properties of the hydroxide particle of Comparative Example 3 covered with a cobalt-containing compound are shown in Table 2 described below.

In Table 2, the component composition was analyzed using an ICP optical emission spectrometer (Optima™ 8300, PerkinElmer, Inc.). A value obtained by subtracting the Co content of the hydroxide particle containing nickel, in which cobalt is solid-solubilized, from the Co content of the nickel-containing hydroxide particle covered with a cobalt-containing compound was defined as the Co content in the covering layer.

The BET specific surface area was measured by a one-point BET method using a specific surface area analyzer (Macsorb®, Mountech Co., Ltd.).

As a classifier, a classifying apparatus (Elbow Jet classifying apparatus EJ-L-3, Nittetsu Mining Co., Ltd.) was used, and classification was performed setting the classifying edge distance M to 41.0 mm, the classifying edge distance F to 30.0 mm, and the air pressure to 0.5 MPa, and feeding the particles to be measured with feed air.

D5, D10, D50, D90, and D95 were measured with a particle size distribution measurement apparatus (LA-950, HORIBA, Ltd.) (principal is laser diffraction/scattering method). Moreover, the value of the particle size distribution width (D90−D10)/D50 was calculated from the measured values of D10, D50, and D90.

The amount of Co (III) was analyzed by iodometry using potassium iodide and sodium thiosulfate.

TABLE 2

| | | Example 1 | Example 2 | Comparative Example 1 | Comparative Example 2 | Comparative Example 3 |
|---|---|---|---|---|---|---|
| Ni | % by mass | 55.5 | 55.8 | 55.4 | 55.8 | 55.6 |
| Total Co | % by mass | 4.14 | 4.20 | 4.10 | 4.14 | 4.24 |
| Co solid-solubilized in hydroxide particle | % by mass | 1.29 | 1.29 | 1.29 | 1.29 | 1.29 |
| Co in covering layer | % by mass | 2.85 | 2.91 | 2.81 | 2.85 | 2.95 |
| Mg | % by mass | 0.75 | 0.76 | 0.75 | 0.76 | 0.75 |
| Total oxidized cobalt (Co (III)) | % by mass | 3.37 | 3.45 | 0.65 | 3.44 | 2.95 |
| Total cobalt oxidation rate (content by percentage (% by mass) of oxidized cobalt (Co (III)) in Total Co) | % | 81.40 | 82.14 | 15.85 | 83.09 | 69.58 |
| Oxidized cobalt (Co (III)) solid-solubilized in hydroxide particle | % by mass | 0.52 | 0.54 | — | 0.59 | 0.00 |
| Oxidation rate of Co solid-solubilized in hydroxide particle | % | 40.31 | 41.86 | — | 45.74 | 0.00 |

TABLE 2-continued

| | | Example 1 | Example 2 | Comparative Example 1 | Comparative Example 2 | Comparative Example 3 |
|---|---|---|---|---|---|---|
| (content by percentage (% by mass) of oxidized cobalt (Co (III)) solid-solubilized in hydroxide particle to Co solid-solubilized in hydroxide particle) | | | | | | |
| Co compound species | | CoHO$_2$ | CoHO$_2$ | Co(OH)$_2$ | γ-CoOOH | CoHO$_2$ |
| BET | m$_2$/g | 19.2 | 22.8 | 9.4 | 13.8 | 17.6 |
| D5 | μm | 5.0 | 3.2 | 4.8 | 8.1 | 5.5 |
| D10 | μm | 5.9 | 3.7 | 5.9 | 9.6 | 6.3 |
| D50 | μm | 10.2 | 5.8 | 10.1 | 15.9 | 10.3 |
| D90 | μm | 16.0 | 9.0 | 15.6 | 25.8 | 16.1 |
| D95 | μm | 18.0 | 10.1 | 17.3 | 29.8 | 18.2 |
| (D90 − D10)/D50 | — | 0.99 | 0.91 | 0.96 | 1.02 | 0.95 |

X-ray diffraction measurement was conducted for Examples 1 to 2, Comparative Examples 1, 2 and 3 and cobalt oxyhydroxide to analyze diffraction peaks. The X-ray diffraction measurement was conducted in the same manner as in Experiment 1 and Experiment 2 described above.

Figure 3:
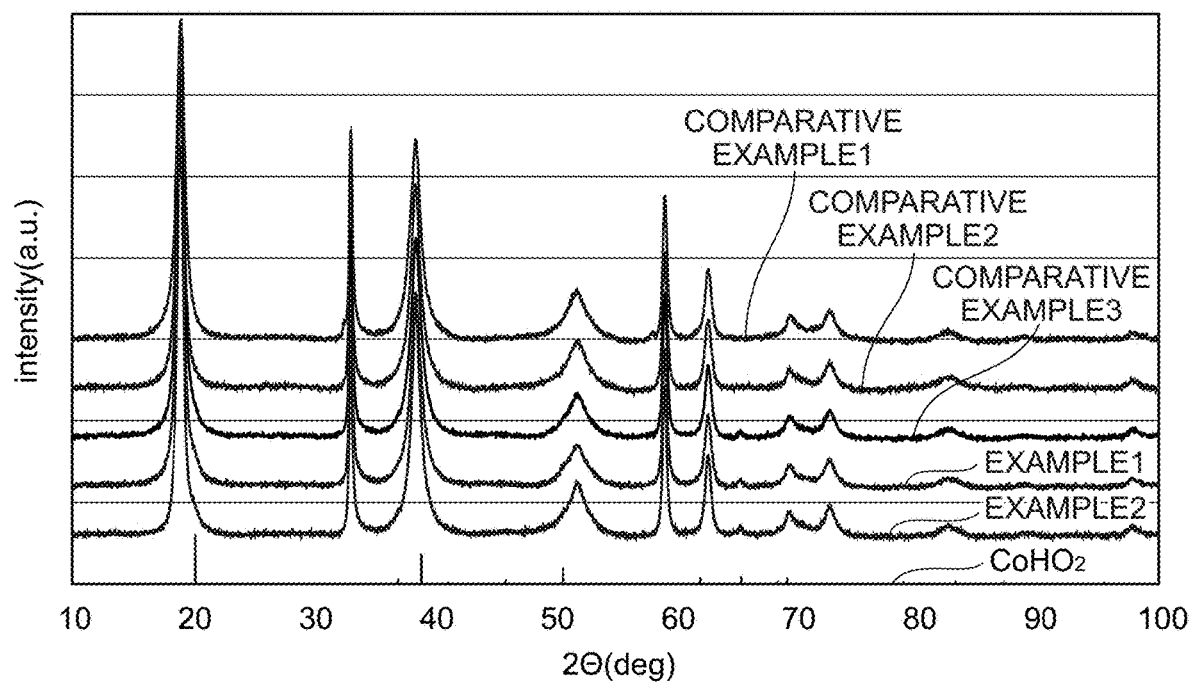
FIG. 3 A graph showing diffraction patterns in X-ray diffraction measurement of Example, Comparative Example, and cobalt oxyhydroxide FIG. 4 A partially enlarged graph of the graph showing diffraction patterns in FIG. 3.
Figure 4:
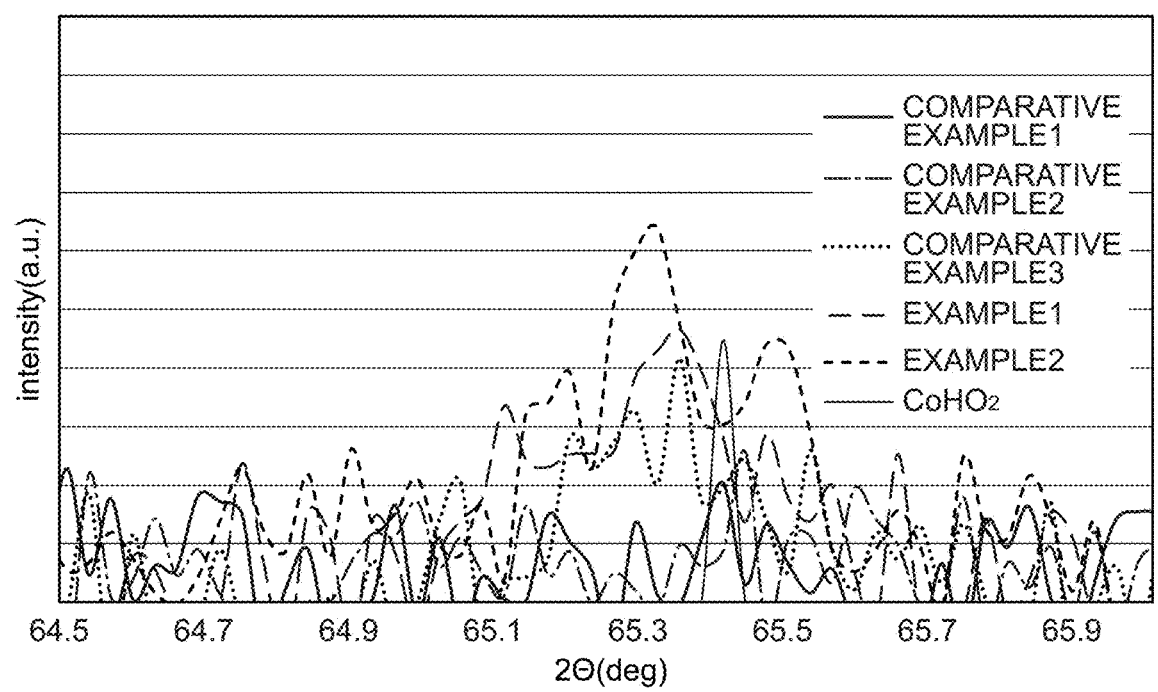

The results of the X-ray diffraction measurement for Examples 1 and 2, Comparative Examples 1, 2 and 3 and cobalt oxyhydroxide are shown in FIG. 3 and FIG. 4.

As shown in FIG. 3 and FIG. 4, a diffraction peak was observed between diffraction angles of 65° and 66°, the diffraction angles represented by 2θ in the diffraction patterns in any of Examples 1 and 2 and Comparative Example 3. Accordingly, it was ascertained that in Examples 1 to 2, at least part of cobalt solid-solubilized in the hydroxide particle containing nickel is solid-solubilized as cobalt oxyhydroxide, which is trivalent cobalt, and in Examples 1 and 2, and Comparative Example 3, the covering layer has cobalt oxyhydroxide. On the other hand, in Comparative Examples 1 and 2, a diffraction peak was not observed between diffraction angles of 65° and 66°, the diffraction angles represented by 2θ.

The physical properties of the samples of D10 or less, D50, and D90 or more in Examples 1 and 2 are shown in Table 3 described below.

TABLE 3

| | | Example 1 - D10 or less | Example 1 - D50 | Example 1 - D90 or more | Example 2 - D10 or less | Example 2 - D50 | Example 2 - D90 or more |
|---|---|---|---|---|---|---|---|
| Ni | % by mass | 54.2 | 56.7 | 57.9 | 51.0 | 55.7 | 57.9 |
| Total Co | % by mass | 6.22 | 3.69 | 2.66 | 7.79 | 3.88 | 2.34 |
| Co solid-solubilized in hydroxide particle | % by mass | 1.29 | 1.29 | 1.29 | 1.29 | 1.29 | 1.29 |
| Co in covering layer | % by mass | 4.93 | 2.4 | 1.37 | 6.50 | 2.59 | 1.05 |
| Mg | % by mass | 0.78 | 0.73 | 0.67 | 0.79 | 0.75 | 0.65 |
| Total oxidized cobalt (Co (III)) | % by mass | 5.77 | 3.03 | 1.94 | 7.03 | 3.14 | 1.65 |
| Total cobalt oxidation rate (content by percentage (% by mass) of oxidized cobalt (Co (III)) in total Co) | % | 92.77 | 82.11 | 72.93 | 90.24 | 80.93 | 70.51 |
| Oxidized cobalt (Co (III)) solid-solubilized in hydroxide particle | % by mass | 0.84 | 0.63 | 0.57 | 0.53 | 0.55 | 0.60 |
| Oxidation rate of Co solid-solubilized in hydroxide particle (content by percentage (% by mass) of oxidized cobalt (Co (III)) solid-solubilized in hydroxide particle to Co solid-solubilized in hydroxide particle) | % | 65.12 | 48.84 | 44.19 | 41.09 | 42.64 | 46.51 |
| D50 | μm | 5.5 | 10.3 | 18.4 | 3.2 | 5.9 | 12.2 |
| BET | m$_2$/g | 24.8 | 18.4 | 16.4 | 37.1 | 20.1 | 13.9 |

Preparation of Positive Electrode

A composition in the form of slurry was prepared by mixing the positive electrode active material, PTFE, and water in amounts such that the particle of Example or Comparative Example, which is a positive electrode active material:PTFE (polytetrafluoroethylene) as binder:water=80:10:10 in terms of mass ratio of solid contents. Foam nickel (collector) was filled with the composition in the form of slurry, thus prepared, and the composition was dried and then rolled, thereby preparing each positive electrode.

Preparation of Evaluation Cell

A positive electrode to which the sample of each Example or each Comparative Example described above was added was used, a hydrogen storage alloy was used as a negative electrode, and polyolefin nonwoven fabric composed of polyethylene and polypropylene was used as a separator. Further, an electrolytic solution containing 6 mol/L of KOH was used as an electrolytic solution to assemble an evaluation cell, and the items described below were evaluated.

(1) Over-Discharge Tolerance Test

After the evaluation cell was stored at 25° C. for 12 hours, the evaluation cell was charged at 0.2 C for 6 hours and then discharged at 0.2 C to 1.0 V. This operation was repeated 10 times to perform activation. A resistor of 10Ω was connected to the cell after the activation, and the cell was stored at 40° C. for 5 days. The cell after the storage was allowed to cool to 25° C., and the discharge capacity was measured when the cell was charged at 0.2 C for 6 hours and then discharged at 0.2 C to 1.0 V. A ratio of the discharge capacity after the connection of the resistor to the discharge capacity at the time of completion of the activation is defined as a capacity retention rate, and the capacity retention rates of Example 2 and Comparative Examples 1 to 3 assuming that the capacity retention rate of Example 1 is 100.0% are defined as relative capacity retention rates.

(2) High-Temperature Tolerance Test

After the evaluation cell was stored at 25° C. for 12 hours, the evaluation cell was charged at 0.2 C for 6 hours and then discharged at 0.2 C to 1.0 V. This operation was repeated 10 times to perform activation. The cell after the activation was stored at 60° C. for 1 week. The cell after the storage was allowed to cool to 25° C., and the discharge capacity was measured when the cell was charged at 0.2 C for 6 hours and then discharged at 0.2 C to 1.0 V. A ratio of the discharge capacity after the storage at 60° C. to the discharge capacity at the time of completion of the activation is defined as a capacity retention rate, and the capacity retention rates of Example 2 and Comparative Examples 1 to 3 assuming that the capacity retention rate of Example 1 is 100.0% are defined as relative capacity retention rates.

The results of evaluating the alkaline storage batteries using the samples of Examples 1 to 2 or Comparative Examples 1 to 3 as a positive electrode are shown in Table 4 described below.

the over-discharge tolerance test and the high-temperature tolerance test as compared to Comparative Examples 1 and 2 where the diffraction peak was not recognized. Accordingly, in Examples 1 to 2, a positive electrode active material for an alkaline storage battery having excellent over-discharge tolerance and high-temperature tolerance can be obtained.

Moreover, as can be seen from the comparison of Examples 1 and 2 with Comparative Example 3, as shown in Tables 2 and 4, when cobalt solid-solubilized in the hydroxide particle containing nickel is oxidized into trivalent oxygen, a positive electrode active material for an alkaline battery in which the over-discharge tolerance and the high-temperature tolerance are improved more can be obtained. In addition, as can be seen from the comparison of Example 1 with Example 2, as shown in Tables 3 and 4, further excellent over-discharge tolerance and high-temperature tolerance can be obtained due to the ratio of the content by percentage of trivalent cobalt solid-solubilized in particles of D10 or less to the content by percentage of trivalent cobalt solid-solubilized in particles of D90 or more being 1.40 or more (in Example 1, 1.47), as compared to the cases where the ratio of the content by percentage is less than 1.0. In addition, as shown in Table 2, the values of the particle size distribution width (D90−D10)/D50 in Examples 1 and 2 are 0.99 and 0.91, respectively.

The positive electrode active material for an alkaline storage battery of the present invention has excellent over-discharge tolerance and high-temperature tolerance and therefore has a high utilization value in the field of a positive electrode active material for an alkaline storage battery that is used in a harsh environment, for example, in the fields of vehicles and the like.

What is claimed is:

1. A positive electrode active material for an alkaline storage battery, comprising:

a hydroxide particle comprising at least nickel and solid-solubilized cobalt; and a covering layer comprising cobalt, the covering layer covering the hydroxide particle, wherein cobalt contained in the covering layer and cobalt contained in the hydroxide particle each have a diffraction peak between

TABLE 4

| | Over-discharge tolerance test | | | High-temperature tolerance test | | |
|---|---|---|---|---|---|---|
| | Discharge capacity mAh/g | Capacity retention ratio % | Relative capacity retention rate Relative % | Discharge capacity mAh/g | Capacity retention ratio % | Relative capacity retention rate Relative % |
| Example 1 | 236.9 | 103.8 | 100.0 | 218.8 | 95.9 | 100.0 |
| Example 2 | 223.3 | 98.5 | 94.9 | 210.5 | 92.8 | 96.8 |
| Comparative Example 1 | 207.3 | 84.9 | 81.8 | 214.2 | 87.7 | 91.5 |
| Comparative Example 2 | 210.7 | 86.2 | 83.0 | 215.3 | 88.1 | 91.8 |
| Comparative Example 3 | 211.4 | 89.9 | 86.6 | 216.4 | 92.0 | 96.0 |

As shown in Table 4 described above, in Examples 1 to 2 where a diffraction peak was observed between diffraction angles of 65° and 66°, the diffraction angles represented by 2θ in the diffraction patterns, excellent capacity retention rate and relative capacity retention rate can be obtained in diffraction angles of 65° and 66°, the diffraction angles each represented by 2θ in a diffraction pattern obtained by X-ray diffraction measurement, and the diffraction peak is derived from a trivalent cobalt compound represented by $CoHO_2$.

2. The positive electrode active material for an alkaline storage battery according to claim 1, wherein a content by percentage of trivalent cobalt in cobalt contained in the hydroxide particle is 30% by mass or more.

3. The positive electrode active material for an alkaline storage battery according to claim 2, wherein a ratio of a content by percentage of the trivalent cobalt contained in hydroxide particles having a secondary particle diameter (≤D10) where a cumulative volume percentage is 10.0% by volume or less to a content by percentage of the trivalent cobalt contained in hydroxide particles having a secondary particle diameter (≥D90) where a cumulative volume percentage is 90.0% by volume or more is 1.20 or more.

4. The positive electrode active material for an alkaline storage battery according to claim 1, wherein (secondary particle diameter (D90) of the positive electrode active material for an alkaline storage battery, where cumulative volume percentage is 90.0% by volume−secondary particle diameter (D10) of the positive electrode active material for an alkaline storage battery, where cumulative volume percentage is 10.0% by volume)/secondary particle diameter (D50) of the positive electrode active material for an alkaline storage battery, where the cumulative volume percentage is 50.0% by volume, is 0.80 or more and 1.10 or less.

5. A positive electrode comprising the positive electrode active material for an alkaline storage battery according to claim 1.

6. An alkaline storage battery comprising the positive electrode according to claim 5.

* * * * *